(12) United States Patent
Applegate et al.

(10) Patent No.: US 10,417,340 B2
(45) Date of Patent: Sep. 17, 2019

(54) COGNITIVE COLLABORATIVE MOMENTS

(71) Applicant: INTERNATIONAL BUSINESS MACHINES CORPORATION, Armonk, NY (US)

(72) Inventors: Katelyn Applegate, Raleigh, NC (US); Thomas J. Blanchflower, Raleigh, NC (US); Jonathan F. Brunn, Logan, UT (US); Michael A. Celedonia, Wake Forest, NC (US); Scott E. Chapman, Groton, MA (US); Dennis J. Chen, Wellesley, MA (US); Ami H. Dewar, Durham, NC (US); Rachael M. H. Dickens, Raleigh, NC (US); Ethan A. Geyer, Mebane, NC (US); Bo Jiang, Beijing (CN); Rogelio Vazquez-Rivera, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/790,769

(22) Filed: Oct. 23, 2017

(65) Prior Publication Data

US 2019/0121852 A1    Apr. 25, 2019

(51) Int. Cl.
*G06F 17/27* (2006.01)
*G06F 16/35* (2019.01)
(Continued)

(52) U.S. Cl.
CPC ........ *G06F 17/2785* (2013.01); *G06F 16/353* (2019.01); *G06F 17/278* (2013.01);
(Continued)

(58) Field of Classification Search
CPC ... G06F 17/30719; G06F 17/00; G06F 17/212
See application file for complete search history.

(56) References Cited

U.S. PATENT DOCUMENTS 8,788,487 B2   7/2014  Stout et al.
2008/0033938 A1*  2/2008  Okamoto .......... G06F 17/30731
(Continued)

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.
(Continued)

*Primary Examiner* — Feng-Tzer Tzeng
(74) *Attorney, Agent, or Firm* — Kenneth Han

(57) ABSTRACT

A method, computer system, and computer program product for cognitively summarizing one or more collaborative moments is provided. An embodiment may include receiving a plurality of communications sent during a collaborative session. The embodiment may also include grouping the plurality of received communications into one or more bursts. The embodiment may further include assigning one or more keywords or one or more entities to each burst. The embodiment may also include generating a summary for each burst using one or more natural language processing techniques based on the assigned one or more keywords or one or more entities. The embodiment may further include transmitting the generated summary to each user participating in the collaborative session.

20 Claims, 5 Drawing Sheets

(51) Int. Cl.
    *H04L 12/18*     (2006.01)
    *G06N 5/04*     (2006.01)
    *G06F 17/21*     (2006.01)
    *G06F 17/00*     (2019.01)

(52) U.S. Cl.
    CPC ............ *G06F 17/00* (2013.01); *G06F 17/212* (2013.01); *G06N 5/043* (2013.01); *H04L 12/1831* (2013.01)

(56) References Cited

U.S. PATENT DOCUMENTS

| | | | |
|---|---|---|---|
| 2009/0307189 A1* | 12/2009 | Bobbitt .................... | G06F 17/30 |
| 2010/0076995 A1* | 3/2010 | Pan ..................... | G06F 17/3064 707/770 |
| 2014/0059582 A1* | 2/2014 | Knowles ................ | G06Q 10/10 725/24 |
| 2014/0195897 A1* | 7/2014 | Balinsky ........... | G06F 17/30719 715/254 |
| 2014/0245178 A1 | 8/2014 | Smith | |

OTHER PUBLICATIONS

Adams, "Conversation thread extraction and topic detection in text-based chat", Calhoun Institutional Archive of the Naval Postgraduate School, Calhoun: The NPS Institutional Archive: Thesis and Dissertation Collection, Naval Postgraduate School, Monterey, California, http://hdl.handle.net/10945/3926, Sep. 26, 2008, pp. 1-192.

Shen, et al.,"Thread Detection in Dynamic Text Message Streams", Published in SIGIR '06: Proceedings of the 29th annual international ACM SIGIR conference on Research and development in information retrieval, ISBN 1-59593-369-7, Jan. 1, 2006, pp. 35-42.

Bengel, et al., "ChatTrack: Chat Room Topic Detection Using Classification", Information & Telecommunication Technology Center University of Kansas, International Conference on Intelligence and Security Informatics, ISI 2004, Tucson, AZ, USA, Jun. 10-11, 2004, Lecture Notes in Computer Science (LNCS), vol. 3073, © Springer-Verlag Berlin Heidelberg 2004, pp. 266-277.

Erera, et al., "Conversation detection in email systems", Published in: Proceeding ECIR'08 Proceedings of the IR research, 30th European conference on Advances in information retrieval, Glasgow, UK, Mar. 30-Apr. 3, 2008, © Springer-Verlag Berlin, Heidelberg 2008, pp. 1-43.

Elsner, et al., "You talking to me? A Corpus and Algorithm for Conversation Disentanglement", Brown Laboratory for Linguistic Information Processing (BLLIP), Brown University, Proceedings of ACL-08: HLT, Columbus, Ohio, USA, Jun. 2008, © 2008 Association for Computational Linguistics, pp. 834-842.

Elsner, et al., "Disentangling Chat", Brown Laboratory for Linguistic Information Processing (BLLIP), Brown University, Submission accepted for publication: Mar. 3, 2010, © 2010 Association for Computational Linguistics, vol. 36, No. 3, pp. 389-409.

Durham, "Topic detection in online chat", Calhoun Institutional Archive of the Naval Postgraduate School, Calhoun: The NPS Institutional Archive: Thesis and Dissertation Collection, Naval Postgraduate School, Monterey, California, http://hdl.handle.net/10945/4513, Sep. 2009, pp. 1-104.

digest.ai, "Your daily digest of your team's chat conversations", https://digest.ai/, Copyright © Graph Paper Co 2016, All Rights Reserved, printed on Mar. 6, 2017, pp. 1-9.

Slack Digest AI, "Your daily digest for the most important conversations in your Slack channels", http://slackdigest.com/, Slack Digest is built by Digest AI, © Digest.AI, All rights reserved, printed on Mar. 6, 2017, pp. 1-4.

Producthunt, "Slack Digest: Your daily digest for the most important conversations in your Slack channels", https://www.producthunt.com/posts/slackdigest, printed on Mar. 6, 2017, pp. 1-13.

Slack, "PaperBot", https://slack.com/apps/A0NE9L9RR-paperbot, printed on Mar. 6, 2017, p. 1.

Slack, "Using Slack Get to know the basics, and a few helpful tips & tricks along the way! Email notifications", https://get.slack.help/hc/en-us/articles/201649273-Email-notifications, printed on Mar. 6, 2017, pp. 1-3.

Uthus, "Plans Toward Automated Chat Summarization", Proceedings of the Workshop on Automatic Summarization for Different Genres, Media, and Languages, Portland, Oregon, Jun. 23, 2011, © 2011 Association for Computational Linguistics, pp. 1-7.

Sood, et al., "Topic-Focused Summarization of Chat Conversations", 35th European Conference on Information Retrieval, Moscow, Russia, Centre for Search and Information Extraction Lab International Institute of Information Technology, Hyderabad—500 032, India, Mar. 2013, P. Serdyukov et al. (Eds.): ECIR 2013, LNCS 7814, pp. 801-804, 2013, © Springer-Verlag Berlin Heidelberg 2013.

Applegate et al., "IBM Watson Workspace & Work Services", The World of Watson 2016 Conference, Mandalay Bay, Las Vegas, Nevada, Oct. 24-27, 2016, pp. 1-12, Grace Period Disclosure.

Applegate et al., "Watson Work Services", The World of Watson 2016 Conference, Mandalay Bay, Las Vegas, Nevada, Oct. 24-27, 2016, pp. 1-7, Grace Period Disclosure.

Applegate et al., "IBM Watson Workspace", The World of Watson 2016 Conference, Mandalay Bay, Las Vegas, Nevada, Oct. 24-27, 2016, 1 page, Grace Period Disclosure.

Applegate et al., "Understanding moments", The World of Watson 2016 Conference, Mandalay Bay, Las Vegas, Nevada, Oct. 24-27, 2016, p. 1-4, Grace Period Disclosure.

IBM, "Team collaboration with the built-in power of Watson", IBM Watson Workspace, https://www.ibm.com/watson/work/workspace/, pp. 1-6, printed on Oct. 23, 2017.

IBM, "Put Watson to Work for You", Watson Workspace, https://workspace.ibm.com/signin?I=true,1 page, printed on Mar. 6, 2017.

\* cited by examiner

COGNITIVE COLLABORATIVE MOMENTS

Aspects of the present invention may have been disclosed by the inventors in the presentation "IBM Watson Workspace & Work Services", "Watson Work Services", and "IBM Watson Workspace" presented to the public at IBM World of Watson Conference 2016 from Oct. 24-27, 2016. The following disclosure is submitted under 35 U.S.C. § 102(b)(1)(A).

BACKGROUND

The present invention relates, generally, to the field of computing, and more particularly to persistent collaboration spaces.

Persistent collaboration spaces may relate to computer software programs that combine the communication capabilities of messaging programs with interaction capabilities of collaboration programs. Persistent collaboration spaces may allow users to share real-time communications, such as chat, images, voice, and other communicative content, in a persistent space where the communications are stored for subsequent viewing and consumption by users. Furthermore, a software program that provides a persistent collaboration space may allow for individual internal and external to an organization to collaborate together from any device in a seamless manner.

SUMMARY

According to one embodiment, a method, computer system, and computer program product for cognitively summarizing one or more collaborative moments is provided. The embodiment may include receiving a plurality of communications sent during a collaborative session. The embodiment may also include grouping the plurality of received communications into one or more bursts. The embodiment may further include assigning one or more keywords or one or more entities to each burst. The embodiment may also include generating a summary for each burst using one or more natural language processing techniques based on the assigned one or more keywords or one or more entities. The embodiment may further include transmitting the generated summary to each user participating in the collaborative session.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
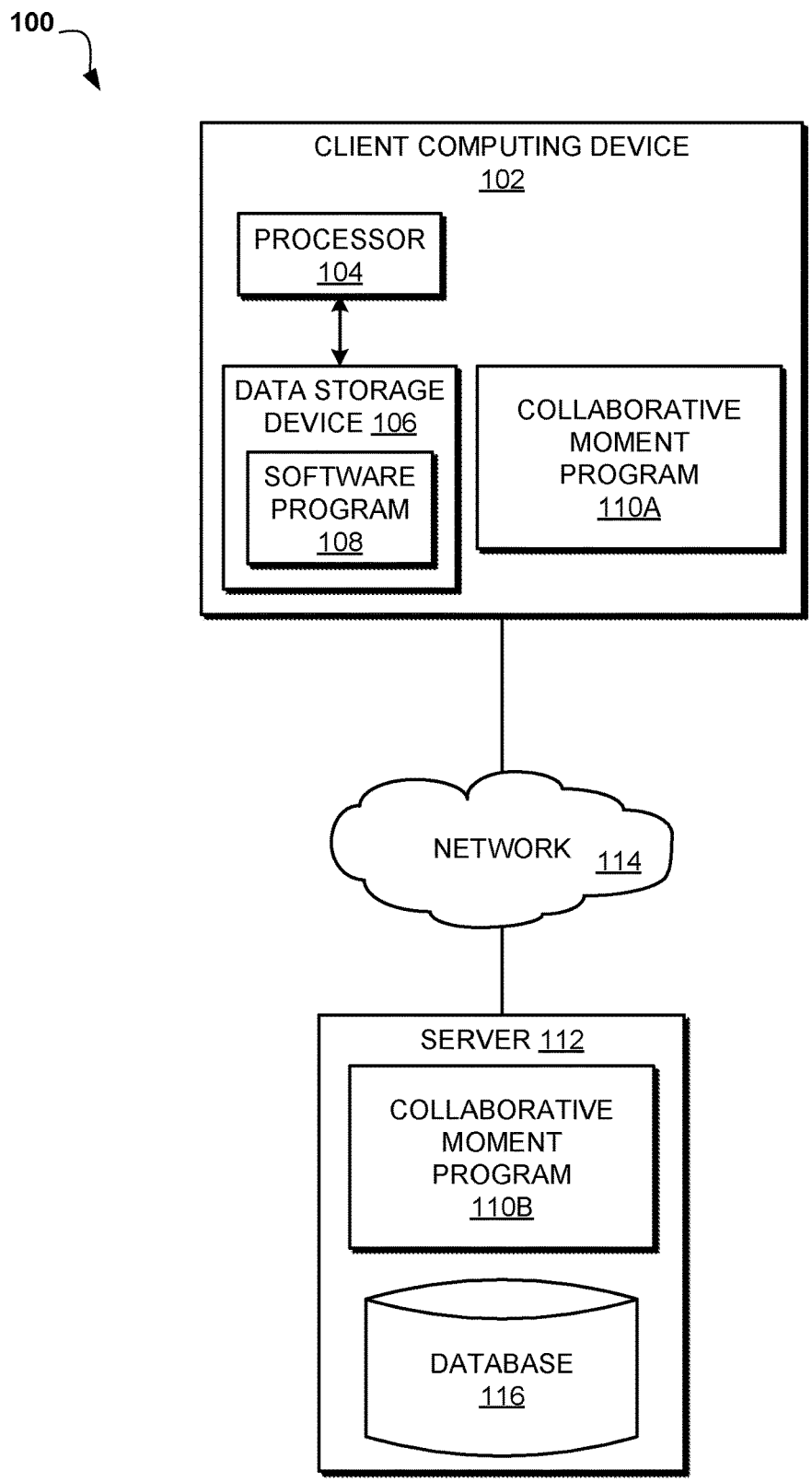
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to user-to-user messaging. The following described exemplary embodiments provide a system, method, and program product to, among other things, disentangle multiple threads within a conversation in a persistent collaboration spaces. Therefore, the present embodiment has the capacity to improve the technical field of persistent collaboration spaces by enhancing message searches through the grouping of messages into "moments" which reduces the amount of items to review in a search. Additionally, notifications may be improved through the clustering of messages since machine learning may be better applied over patterns of "moments".

As previously described, persistent collaboration spaces may relate to computer software programs that combine the communication capabilities of messaging programs with interaction capabilities of collaboration programs. Persistent collaboration spaces may allow users to share real-time communications, such as chat, images, voice, and other communicative content, in a persistent space where the communications are stored for subsequent viewing and consumption by users. Furthermore, a software program that provides a persistent collaboration space may allow for individual internal and external to an organization to collaborate together from any device in a seamless manner.

In modern communication mediums, engagement with other individuals may be experienced through persistent collaboration spaces or user-to-user messaging programs. Despite a seemingly constant connection to and an increased need to remain constantly available on such messaging programs, users may frequently be distracted or otherwise away from a conversation. For example, in an instant messenger chat session, a user may be distracted by a received email and miss a sequence of messages received over a 15 minute period. When the distracted user returns to the conversation, the user may need to review a long series of received messages to fully understand the history of the collaborative work exchanged while the user was away. Additionally, users that step away from a conversation for various reasons may feel a loss of control by being removed from a conversation for an extended period of time thereby compelling the user to monitor conversations and notifications rather than participating in other activities for a fear of missing a vital exchange in the conversation. For example, an individual may feel the need to constantly check a work-related message board while at home so the individual does not miss any information exchanged by a team. When the user returns to the conversation, the user may feel required to read the entire conversation transcript rather than the most recent messages as reading the entire transcript may help the user better understand the conversation flow thereby allow the user to appropriately react and shape the conversation moving forward. However, reading the entire conversation transcript may be burdensome or infeasible for a returning user depending on the length of time for which the user was away and the number of individuals participating in the conversation. As such, it may be advantageous to, among other things, analyze a conversation history and separate the conversation into one or more "moments" that can be reviewed by users that did not participate in the conversation.

According to one embodiment, keyword and entity extractors may be utilized to identify start and end points bursts in a conversation and the reasons for the occurrence of the start and end points. A burst may a pattern of waxing and waning topics identifiable through the use of keywords and a pluggable entity extractor may be used to identify a cohesive set of messages which aid in summarization, including multiple overlapping threads. Additionally, natural language classifiers may be implemented to train the system based on user tagging and user actions taken.

By clustering messages within a conversation into a burst, machine learning may be applied over patterns of moments to augment a social graph by adding relationships between users, keywords, and entities. Doing so may lend to curation and training since moments may have discrete start and end points that are difficult to detect. Since the system may not fully disentangle a multiple thread conversation, a user may more easily adjust the boundaries of a burst than a system which fully disentangles conversations. Furthermore, generated summaries may be adjusted to assist in training the underlying natural language classifiers, entity extractors, and keyword extractors with minimal or no user intervention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify one or more moments within a conversation thread in order to generate a conversation summary for users.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a collaborative moment program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a collaborative moment program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the collaborative moment program 110A, 110B may be a program capable of analyzing a conversation thread within a user-to-user messaging program to determine start and end points for one or more moments that occur within the conversation thread. The one or more determined moments may be utilized to generate a summary of the conversation thread for a user to better understand the conversation that occurred in which the user participated or to review should the user have missed some or all of the conversation. The collaborative moment method is explained in further detail below with respect to FIG. 2.

Figure 2:
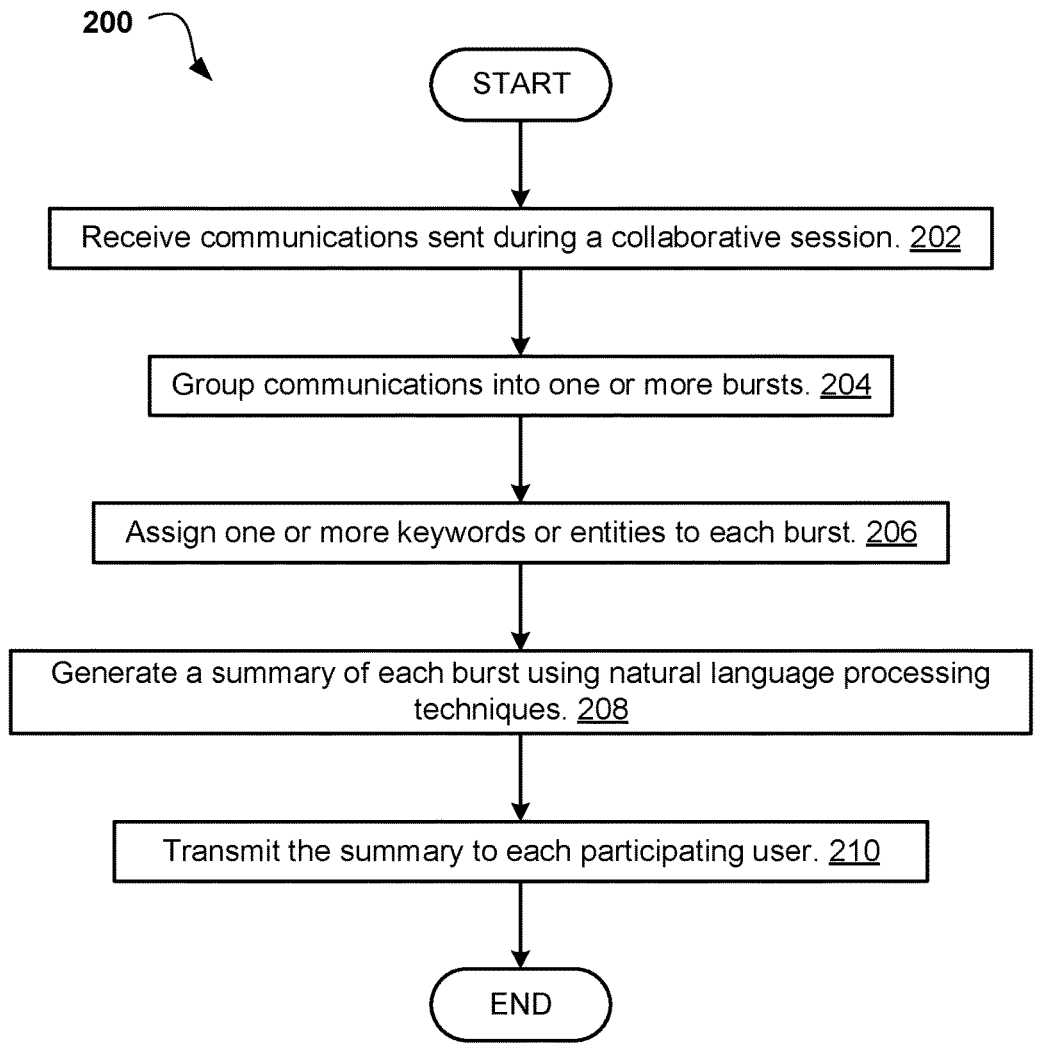
FIG. 2 is an operational flowchart illustrating a collaborative moment process according to at least one embodiment.

Referring now to FIG. 2, an operational flowchart illustrating a collaborative moment process 200 is depicted according to at least one embodiment. At 202, the collaborative moment program 110A, 110B receives communications sent during a collaborative session. As previously described, persistent collaboration spaces may allow users to share real-time communications, such as chat, images, voice, and other communicative content, in a persistent space where the communications are stored for subsequent viewing and consumption by users. A thread may be a series of messages that are in natural continuation of previous messages within a single collaborative session or exchange. Messages submitted to the collaborative space may be the communications received by the collaborative moment program 110A, 110B. In at least one embodiment, the collaborative moment program 110A, 110B may receive actions taken across one or more applications aggregated into a team space. For example, the collaborative moment program 110A, 110B may receive ten chat messages in a persistent team chat, a web conference, three file share actions during an instant message group chat, and email.

Then, at 204, the collaborative moment program 110A, 110B groups communications into one or more bursts. The collaborative moment program 110A, 110B may group communications based on the temporal relatedness of each message by analyzing inter-message time intervals, total elapsed conversation duration, and message topic. The collaborative moment program 110A, 110B, using a summarizer, may compute the beginning and end of each burst by locating waxing and waning usage of summary phrases in received messages based on an assigned relevance score. For example, in a series of five communications, if the three communications received earliest all have the associated keyword "vacation" with a relevancy score above 70%, then the collaborative moment program 110A, 110B may group the three communications together in a burst based on the assigned keyword "vacation." A burst may continue to exist so long as the assigned relevance score for each message remains above a preconfigured threshold value. Additionally, a burst may continue as long as sufficient similarity exists between summary phrases of existing messages and new messages to be added to the burst. When the subset of summary phrases previously on the summary falls beneath a threshold size, a new moment may begin. Furthermore, the collaborative moment program 110A, 110B may require the set of summary phrases to have the same entries within any given burst. For example, when the subset of summary phrases previously within the summary falls beneath a particular size, the collaborative moment program 110A, 110B may determine that a new burst has begun. Furthermore, terms may be added or removed from the subset so long as a certain threshold of terms remain when comparing new messages to be added to the burst and the messages of the burst.

For instance, the first 10 messages may be summarized with keywords "vacation", "France", "wine", "food", and "Paris". After ten more messages, the collaborative moment program 110A, 110B may consider the ten new messages or the burst that would result by adding them to the prior messages as text to be summarized and compared to the first 10 messages.

Given this new set of messages, the collaborative moment program 110A, 110B may identify the keywords "food", "wine", and "Paris". Since the set in common among the original messages and new messages is at or above a threshold (in this case, 3 or, as a ratio, 3 out of 5), the collaborative moment program 110A, 110B may determine the topic has not changed sufficiently to define a new burst, and the new messages may be assigned to the existing burst. The determination may occur message by message, or with other groups of messages.

Such grouping of messages may include "turns", which are groups of messages defined by the largest set of continuous messages with one speaker, or the largest set with one speaker without a sufficient gap between messages, or by other groups. For instance, messages may be grouped by the largest group possible where all the messages in a group have less than a certain time between them. In other words, messages may be grouped where an inter-message interval between messages of the group are all sufficiently small. These may be groups of messages from one message to multiple blocks.

In one embodiment, when there few messages in a burst (i.e., below a threshold), a new block may be assigned to the burst, or may be assigned to the burst, if the time between the new message and the preceding message is small enough. When a sufficient time has passed between a preceding message and a new message, a new burst may be defined. When there are sufficiently many messages in a burst, the system may identify associated keywords.

The collaborative moment program 110A, 110B may further identify similarity or relatedness of keywords from a new candidate block to be added to the burst and the existing burst. This can be accomplished with a word or document embedding considering the keywords or entities as the document and computing a similarity metric between the embedding of the new keywords and entities and the prior keywords and entities for the burst.

The collaborative moment program 110A, 110B may also assign a probability that the current block is part of the current burst by computing a formula on the similarity metric. When the probability is sufficiently low for a new block, or when the probability has been low for a series of blocks, the collaborative moment program 110A, 110B may define a new burst to begin with the new block.

In some cases, the collaborative moment program 110A, 110B may use an external keyword or entity extractor, such as IBM Watson® Natural Language Understanding (Watson and all Watson-based trademarks and logos are trademarks or registered trademarks of International Business Machines Corporation and/or its affiliates), when analyzing blocks of messages. Such a system may receive text as an input and give a set of keywords, entities, categories or other descriptive text in a taxonomy hierarchy as an output, along with a corresponding score for each. Such methods may use the position of words within the text, their coincidence or location relative to other words, co-references to words across sentences, grammatical clues, sentiment, and other other natural language features to find a score for each phrase and rate it's importance to the text.

The collaborative moment program 110A, 110B may compute an aggregate similarity score which takes into account the relevance scores of individual keywords. For instance, if a natural language understanding component assigns a score of 0.5 to a first keyword, 0.1 to a second keyword, and the first keyword is the same between two sets of messages, the collaborative moment program 110A, 110B may consider these two sets of messages more similar than if only the second keyword had matched because the relevance score for the second keyword was lower in the original text. Thus, the total ratio of similar keywords between two sets of messages may be adjusted by relative weights.

In the preceding example, although ⅗ of the keywords may be in common, after adjusting or weighting for the relevance of the scores to each set of messages, a different score may be computed. For instance, in one embodiment, a relative keyword score for a burst or block is computed by taking the relevance of that keyword and then dividing by the sum of the relevance of all keywords in the set of messages analyzed. In one embodiment, when looking at a new block, the relevance of the keywords common to the existing burst and new block may be summed, and then divided by the total sum of relevance scores in the original set of messages to arrive at a score for the related keywords. This score may then be compared to a threshold to decide if the new block is a part of the burst.

The collaborative moment program 110A, 110B may also consider the change in relevance scores between the prior and new messages. For instance, if a score has decreased in the new set of messages, the relevance score may be given less weight, proportionally or by another formula.

Additionally, the collaborative moment program 110A, 110B may merge new blocks into the burst iteratively, with the combined new and old messages defining a burst, if the similarity is sufficient, or the new block defining its own burst, if the similarity is sufficiently small with the existing burst. The collaborative moment program 110A, 110B may iteratively process block-by-block such that each new block of messages to be considered for the burst is only compared with the preceding block.

Additionally, the collaborative moment program 110A, 110B may also consider inter-message time intervals and total elapsed duration of a series of communications when identifying the beginning and end of each burst. For example, in the previously presented example, if the first two communications were received in quick succession but the third communication was received over a day later, the collaborative moment program 110A, 110B may determine the first two communications should be included in the same burst but the third communication should not due to the temporal distance between when the third communication was received in relation to the first two communications.

While parsing through each message, the collaborative moment program 110A, 110B may utilize a keyword configurable and pluggable entity extractor, such as IBM Watson® Natural Language Understanding, to produce summary phrases for each message. The collaborative moment program 110A, 110B may also use an entity extractor to make use of terms, such as mentions or co-references, across messages to note when messages have inter-references to entities and thus continue the burst.

Additionally, the collaborative moment program 110A, 110B may utilize a continuation classifier to classify certain messages as inherently being responses, and ensuring that the moment continues through such words or phrases. For example, a messages beginning with the word "Yes" or the phrase "I agree", the collaborative moment program 110A, 110B may identify the entire message may most likely be a continuation of the burst. The collaborative moment program 110A, 110B may ignore such messages with respect to the messages the compose a summary block.

In an example embodiment, the collaborative moment program 110A, 110B may identify a candidate block of messages, then extract keywords and entities from the block. If the first message in the block is sufficiently close to the last message in the current burst or if the existing burst is not empty, the collaborative moment program 110A, 110B may compare keywords and entities of the block to keywords and entities from the current burst. If the keywords and entities of the block are sufficiently similar to those of the burst, the block may be added to the current burst, otherwise, the block may become a new burst.

Next, at 206, the collaborative moment program 110A, 110B assigns one or more keywords or entities to each burst. Since each burst may be a group of temporally related messages, the collaborative moment program 110A, 110B may assign one or more keywords or entities to each burst to classify the subject matter of each burst. Utilizing the summarizer to parse through each received message, or a user specified number of previous messages in a conversation, as a message block, the collaborative moment program 110A, 110B may assign one or more keywords, or summary phrases, associated with the information presented in each message. For example, if a group of five messages relates to a team project, the collaborative moment program 110A, 110B may assign the keywords "team project" to the burst. In at least one embodiment, each keyword or entity may be most strongly associated with the set of messages where the relevance score from the summary phrase reaches a local maximum. Therefore, the collaborative moment program 110A, 110B may identify the keyword or entity most closely related to the local maximum relevancy score and assign that keyword or entity with the burst as a whole.

Then, at 208, the collaborative moment program 110A, 110B generates a summary of each burst using natural language processing techniques. The collaborative moment program 110A, 110B may summarize each burst with a combination of a set of configurable natural language classifiers, entity extractors, and identified key messages. The configurable natural language classifiers may be applied to messages to identify key messages. Additionally, the entity extractors may include configurable entity models, such as Watson® Knowledge Studio (Watson and all Watson-based trademarks and logos are trademarks or registered trademarks of International Business Machines Corporation and/ or its affiliates), keyword extractors, and taxonomy classifiers. Furthermore, the key messages may be identified by a function applied based on the entities and keywords associated with the overall burst. The messages and events in the burst may be searched for the summary phrases, and a cumulative relevance score for the message may be computed. In at least one embodiment, the score may be sum of the relevance scores of any keywords and entities appearing in that messages. Similar to the identification of bursts, the collaborative moment program 110A, 110B may include elements in various formats, such as chat messages in a persistent team chat, a web conference messages and videos, file share actions, and email messages.

In at least one embodiment, the collaborative moment program 110A, 110B may utilize one or more natural language classifiers to classify messages or turns in the conversation and identify key messages that are received.

In identifying key messages, a simple simple linear combination may be used. If message 1 has keywords X and Y with scores 0.4, and message 2 has keyword Z with score 0.9, then message 2 would receive a higher score and be more likely to be selected as a key message. Identifying a message may be done through other weighted or non-linear formulas being applied to the individual keyword scores, for instance, using a logarithmic or exponential scale applied to a weighted score to give more or less weight to having more or fewer keywords. This process orders all messages in the burst and the system may select 0 or more as key messages. The set of key messages may be selected by selecting all with scores above a threshold, may be further constrained by device and delivery mechanism, and may vary depending on the length of the original content. For instance, for longer bursts, the system may allow for more key messages.

In at least one embodiment, the collaborative moment program 110A, 110B may perform message annotation to add information to or extract information from message which may be elevated to the generated summary. The information may include focuses and relevant messages identified by association of keywords and entities relevant to the overall burst to the message.

Next, at 210, the collaborative moment program 110A, 110B transmits the generated summary to each user participating or subscribed to the collaborative session. Once a summary of each burst is generated, the collaborative moment program 110A, 110B may transmit each summary to each user that participated in or subscribes to the collaborative session. For example, the collaborative moment program 110A, 110B may transmit an email to each user or make each summary available to each user by posting a link on a graphical user interface associated with the persistent chat program. The system may deliver the generated summary through a push notification. The collaborative moment program 110A, 110B may make the summary available as a header or visual annotation on a section of a transcript containing the messages.

It may be appreciated that FIG. 2 provides only an illustration of one implementation and does not imply any limitations with regard to how different embodiments may be implemented. Many modifications to the depicted environments may be made based on design and implementation requirements. Although the above described embodiment utilized the field of medicine as an example, any field that could contain cause and effect connections may be used.

Figure 3:
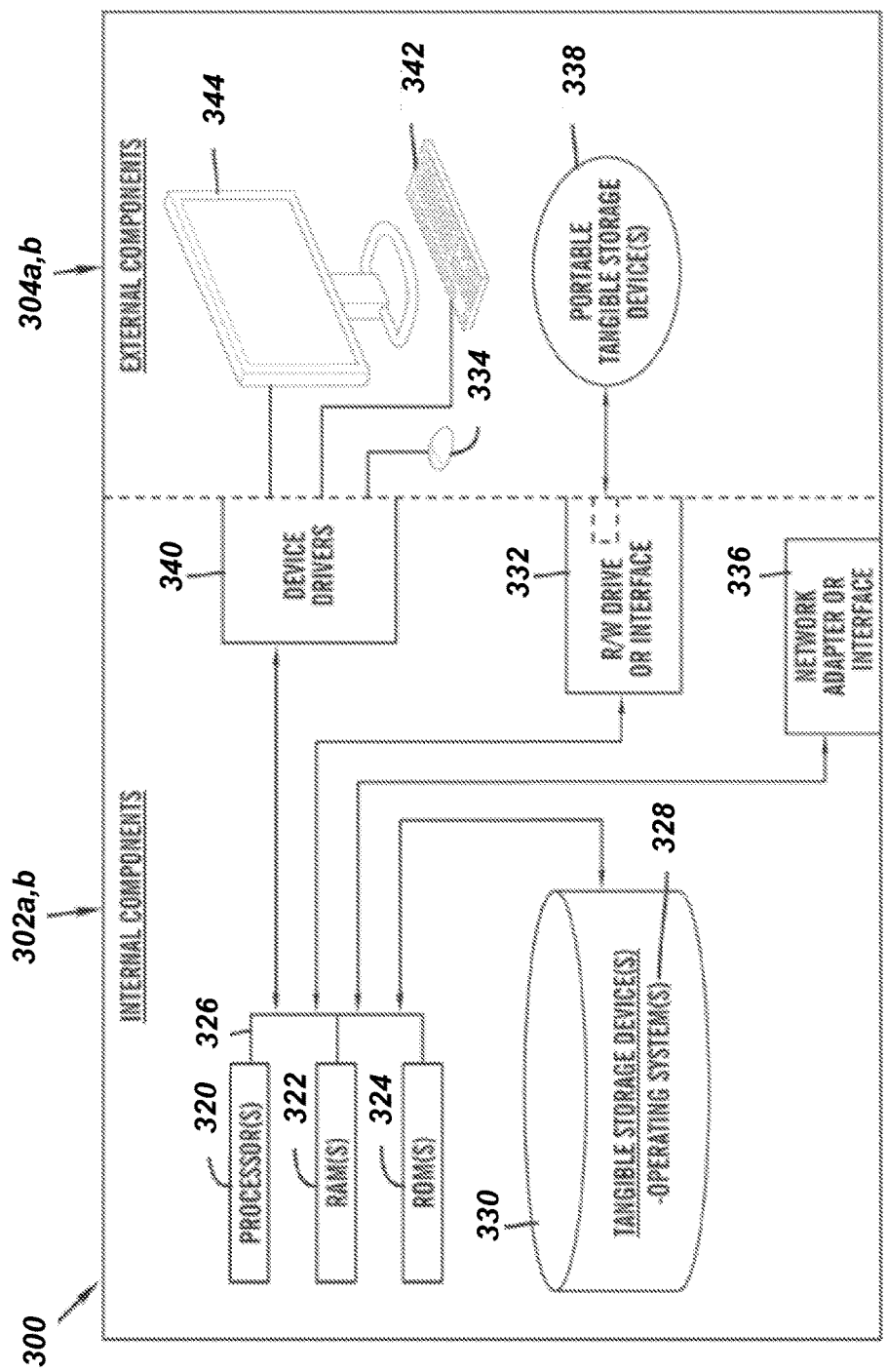
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the collaborative moment program 110A in the client computing device 102 and the collaborative moment program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the collaborative moment program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the collaborative moment program 110A in the client computing device 102 and the collaborative moment program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the collaborative moment program 110A in the client computing device 102 and the collaborative moment program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
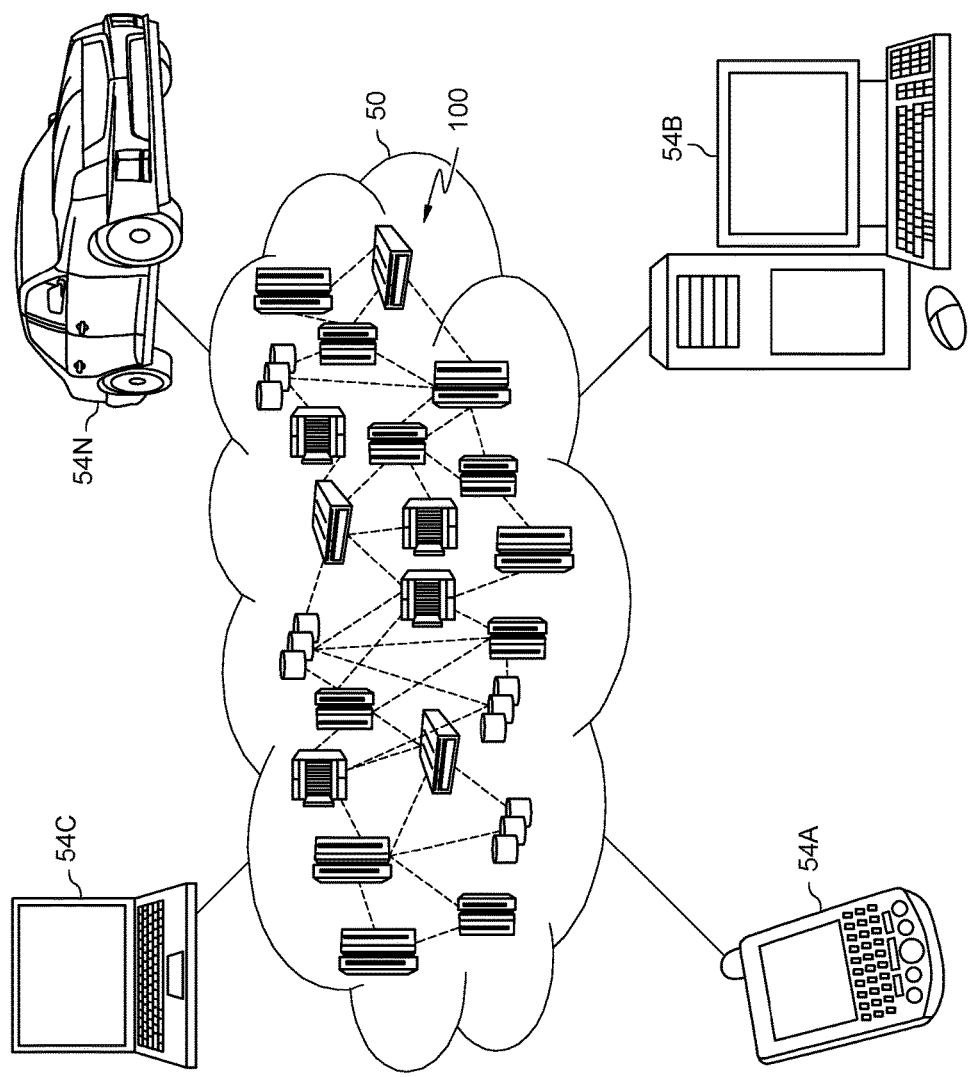
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
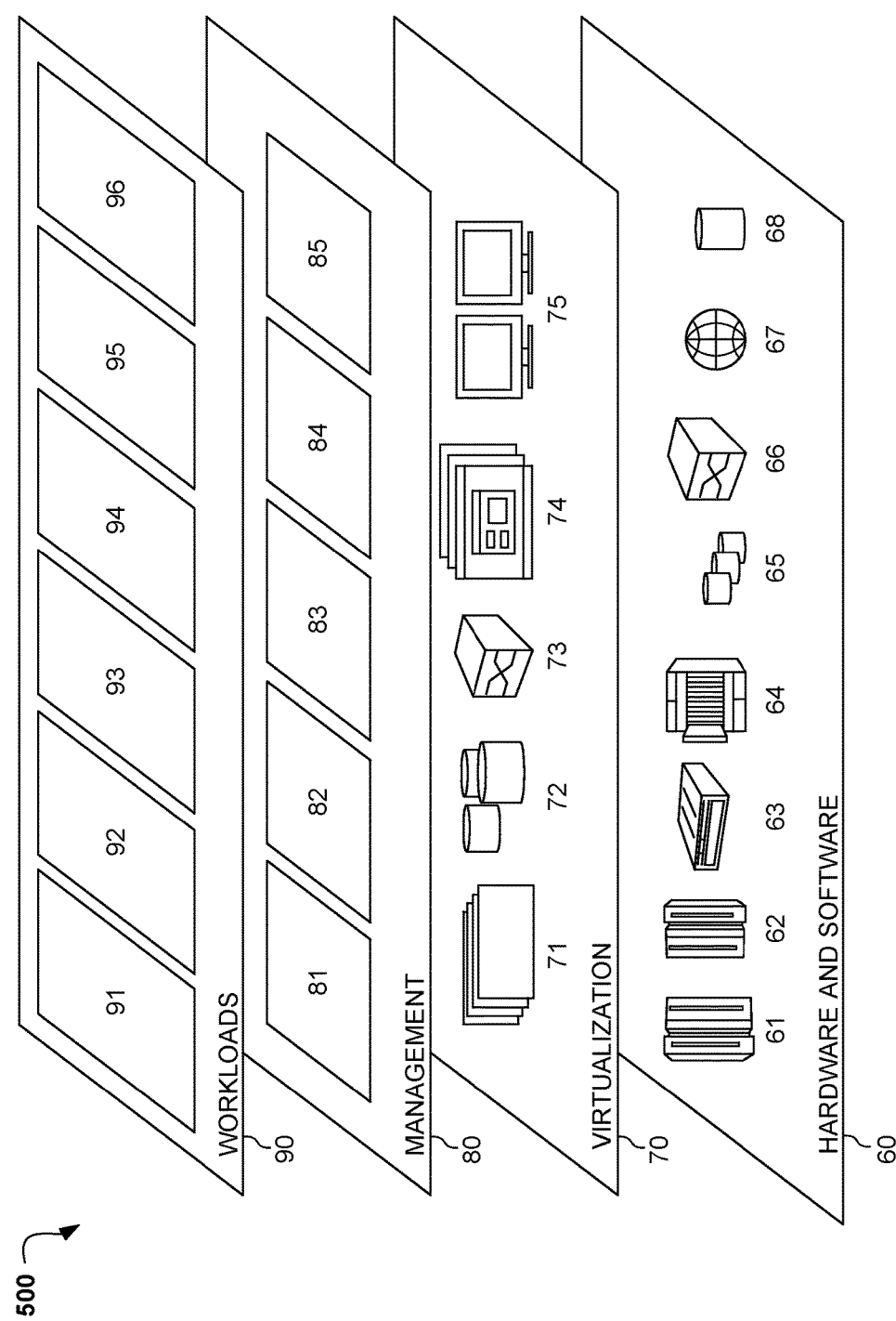
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative moment identification 96. Collaborative moment identification 96 may relate to analyzing messages sent across a persistent chat group to identify groups of messages that are temporally related to a summary of each group may be generated and transmitted to a user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for cognitively summarizing one or more collaborative moments, the method comprising:
receiving, by a processor, a plurality of communications sent during a collaborative session;
grouping the plurality of received communications into one or more bursts based on temporal relatedness of each message by analyzing inter-message time intervals, total elapsed conversation duration, and message topic, wherein the beginning and end of the one or more bursts are computed using an assigned relevance score for each message based on associated keyword, wherein the associated keywords are extracted and assigned to each burst utilizing one or more natural language processing techniques, wherein a burst continues to exist so long as the assigned relevance score for each message remains above a preconfigured threshold value;
generating a summary for each burst using one or more natural language processing techniques to identify key messages based on the assigned one or more keywords or one or more entities, where in the one or more natural language processing techniques include the use of one or more natural language classifiers to select messages to be included in the generated summary; and
transmitting the generated summary to each user participating in the collaborative session.

2. The method of claim 1, wherein the plurality of communications are selected from a group consisting of one or more chat messages, one or more images, one or more videos, one or more emails, and one or more file share actions.

3. The method of claim 1, wherein the collaborative session is selected from a group consisting of a persistent chat, a web conference, an email conversation, and an instant message group chat.

4. The method of claim 1, wherein the one or more bursts are a plurality of temporally related messages within the plurality of received communications.

5. The method of claim 1, wherein the one or more natural language processing techniques comprises selecting one or more key communications from the plurality of received communications.

6. The method of claim 5, wherein selecting the one or more key communications further comprises:
computing an aggregate score for a plurality of summary phrases referenced in a communication relative to a total number of summary phrases in a burst.

7. The method of claim 6, wherein the plurality of summary phrases are selected from a group consisting of one or more keywords, one or more entities, or one or more categories in a taxonomy hierarchy.

8. A computer system for cognitively summarizing one or more collaborative moments, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving a plurality of communications sent during a collaborative session;
grouping the plurality of received communications into one or more bursts based on temporal relatedness of each message by analyzing inter-message time intervals, total elapsed conversation duration, and message topic, wherein the beginning and end of the one or more bursts are computed using an assigned relevance score for each message based on associated keyword, wherein the associated keywords are extracted and assigned to each burst utilizing one or more natural language processing techniques, wherein a burst continues to exist so long as the assigned relevance score for each message remains above a preconfigured threshold value;
generating a summary for each burst using one or more natural language processing techniques to identify key messages based on the assigned one or more keywords or one or more entities, where in the one or more natural language processing techniques include the use of one or more natural language classifiers to select messages to be included in the generated summary; and
transmitting the generated summary to each user participating in the collaborative session.

9. The computer system of claim 8, wherein the plurality of communications are selected from a group consisting of one or more chat messages, one or more images, one or more videos, one or more emails, and one or more file share actions.

10. The computer system of claim 8, wherein the collaborative session is selected from a group consisting of a persistent chat, a web conference, an email conversation, and an instant message group chat.

11. The computer system of claim 8, wherein the one or more bursts are a plurality of temporally related messages within the plurality of received communications.

12. The computer system of claim 8, wherein the one or more natural language processing techniques comprises selecting one or more key communications from the plurality of received communications.

13. The computer system of claim 12, wherein selecting the one or more key communications further comprises:
computing an aggregate score for a plurality of summary phrases referenced in a communication relative to a total number of summary phrases in a burst.

14. The computer system of claim 13, wherein the plurality of summary phrases are selected from a group consisting of one or more keywords, one or more entities, or one or more categories in a taxonomy hierarchy.

15. A computer program product for cognitively summarizing one or more collaborative moments, the computer program product comprising:
one or more computer-readable tangible storage media and program instructions stored on at least one of the one or more tangible storage media, the program instructions executable by a processor capable of performing a method, the method comprising:
receiving a plurality of communications sent during a collaborative session;
grouping the plurality of received communications into one or more bursts based on temporal relatedness of each message by analyzing inter-message time intervals, total elapsed conversation duration, and message topic, wherein the beginning and end of the one or more bursts are computed using an assigned relevance score for each message based on associated keyword, wherein the associated keywords are extracted and assigned to each burst utilizing one or more natural language processing techniques, wherein a burst continues to exist so long as the assigned relevance score for each message remains above a preconfigured threshold value;

generating a summary for each burst using one or more natural language processing techniques to identify key messages based on the assigned one or more keywords or one or more entities, where in the one or more natural language processing techniques include the use of one or more natural language classifiers to select messages to be included in the generated summary; and transmitting the generated summary to each user participating in the collaborative session.

16. The computer program product of claim 15, wherein the plurality of communications are selected from a group consisting of one or more chat messages, one or more images, one or more videos, one or more emails, and one or more file share actions.

17. The computer program product of claim 15, wherein the collaborative session is selected from a group consisting of a persistent chat, a web conference, an email conversation, and an instant message group chat.

18. The computer program product of claim 15, wherein the one or more bursts are a plurality of temporally related messages within the plurality of received communications.

19. The computer program product of claim 15, wherein the one or more natural language processing techniques comprises selecting one or more key communications from the plurality of received communications.

20. The computer program product of claim 19, wherein selecting the one or more key communications further comprises:

computing an aggregate score for a plurality of summary phrases referenced in a communication relative to a total number of summary phrases in a burst.

* * * * *